July 10, 1962     T. GRUBER     3,043,931

MAGNETICALLY CONTROLLED SWITCHING DEVICE

Filed April 13, 1960

INVENTOR
Théophile GRUBER
By John B. Tannenbaum
Attorney

United States Patent Office 3,043,931
Patented July 10, 1962

3,043,931
MAGNETICALLY CONTROLLED SWITCHING DEVICE
Théophile Gruber, Geneva, Switzerland, assignor to Thermindex S.A., Geneva, Switzerland, a firm
Filed Apr. 13, 1960, Ser. No. 22,003
Claims priority, application Switzerland Apr. 14, 1959
5 Claims. (Cl. 200—87)

The present invention relates to a device for controlling the opening and closing of an electric circuit as a function of the position of a movable element.

The said device is characterised by a movable electric switch comprising contact studs whose displacements are controlled by those of the said element, the said switch being so arranged as to be magnetically controlled and comprising on the one hand a resilient device tending to maintain it in one of its two positions, i.e. its open position or its closed position, and on the other hand a magnet intended to offset the action of the said resilient device, and by at least two magnets disposed in the neighbourhood of the path followed by the said switch in the course of its displacements and intended, one to bring the switch into the position opposite to that in which the resilient device tends to maintain it, in which position it is maintained by its own magnet, and the other to bring the switch into the position in which it is maintained by the said resilient device, the whole arrangement being such that, when the movable element is moved in one direction, the said switch occupies one of its two positions, i.e. its open or closed position, while when the said movable element is moved in the other direction the said switch occupies its other position.

The drawing illustrates by way of example one constructional form of the subject of the invention and a variant.

Figure 1:
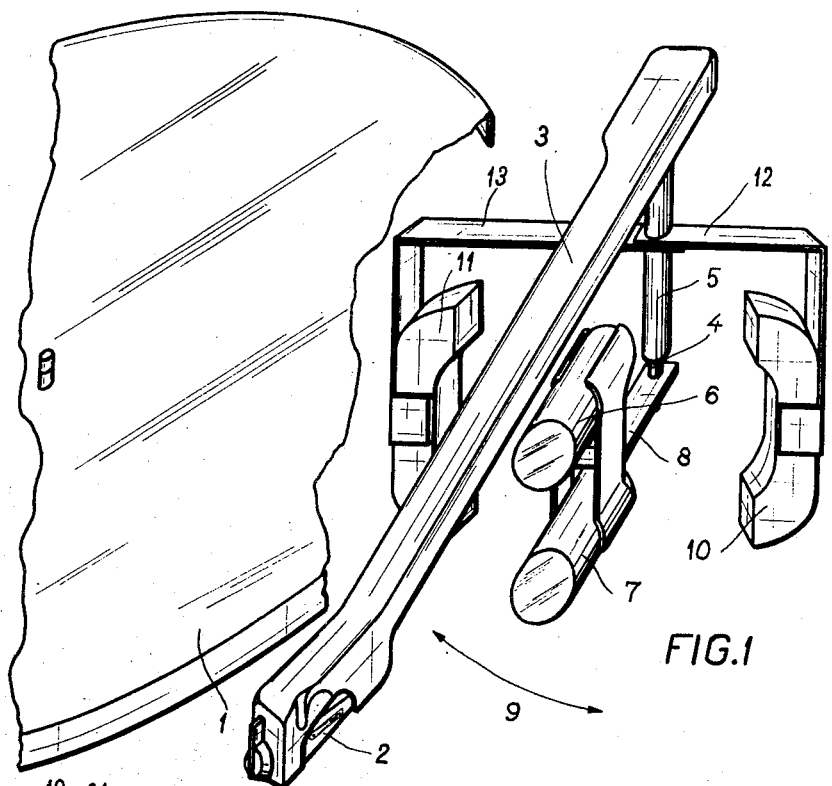
FIGURE 1 is a diagrammatic view in perspective of a part of a gramophone provided with the device according to the invention, wherein only the parts necessary for an understanding of the invention have been illustrated.

The illustrated gramophone is a pick-up comprising a turntable 1 driven by an electric motor (not shown) of the well known type usually employed in such machines. The machine comprises a reproducing head 2 mounted on a movable arm 3 pivotally connected to the frame of the machine (not shown) by means of a pin 4. The latter turns in a fixed tube 5 supported by the said frame. The arm 3 is fast with two glass tubes 6 and 7 supported by a mounting 8, which is in turn fixed to the pin 4. The said two tubes thus move simultaneously with the arm 3 in the direction of the arrow 9. Finally, the machine comprises two permanent magnets 10 and 11 each supported by a mounting 12, 13 respectively, fixed to the tube 5.

The tube 6, which is illustrated in detail in FIGURES 2 to 5, encloses a switch comprising two pairs of contact studs or rivets 14 and 15 connected in series. One of the studs of each pair is supported by a resilient blade 16, 17 respectively. The blades 16 and 17 each carry a soft-iron wafer 18 and 19 respectively, the said wafers being intended for the magnetic control of the said blades. The said wafers may be made of any other magnetic material. The blade 16 also carries a bowed member 20 which is electrically insulated from the blade 16 by a lining 21.

Finally, the switch comprises an auxiliary permanent magnet 22.

Figure 2:
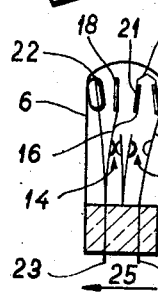
FIGURES 2 to 5 are elevational views, partly in section, of a detail illustrated in four different operating positions.
Figure 3:
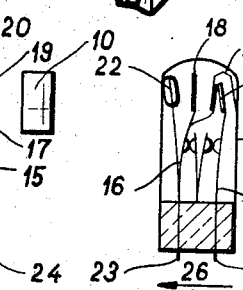
Figure 4:
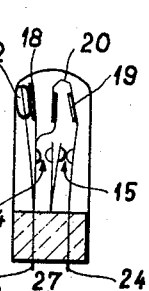
Figure 5:
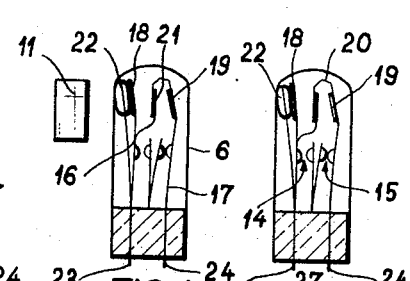

The said switch, of which the input and output terminals are denoted by 23 and 24 respectively, is connected to the feed circuit (not shown) of the motor driving the turntable 1. It operates in the following manner:

The magnets 10 and 11 are so disposed that the tube 6 is subject to the influence of their magnetic field when the arm 3 occupies its inoperative position, and when the reproducing head 2 is situated in the neighbourhood of the centre of a record, at the end of the playing of the latter, respectively. When the arm 3 occupies its inoperative position, the tube 6 is situated in the zone of influence of the magnet 10 (FIGURE 2). The latter attracts the wafer 19 on the blade 17, thus opening the contacts 15, so that the motor of the turntable 1 is not fed. When the arm 3 is displaced in the direction of the arrow 25 (FIGURE 2) in order to bring the reproducing head 2 opposite the start of the disc, the tube 6 leaves the zone of influence of the magnet 10, so that the blade 17 returns to position in which the contacts 14 and 15 are closed (FIGURE 3). The motor of the turntable 1 is thus fed, and the disc is played. The arm 3 then moves in the direction of the arrow 26 of FIGURE 3. At the end of the playing of the disc, the tube 6 is situated in the zone of influence of the magnet 11, which attracts the wafer 18, thus opening the contacts 14 and stopping the motor of the turntable 1 (FIGURE 4). When the arm 3 is returned to its inoperative position, moving in the direction of the arrow 27 of FIGURE 5, the wafer 18 remains attracted by the auxiliary magnet 22, so that the contacts 14 do not close again in the course of this displacement, the motor thus being prevented from starting again for a brief instant. At the instant when the tube 6 again enters the zone of influence of the magnet 10, that is to say, at the instant when the arm 3 reaches its outer position, the wafer 19 is attracted by the magnet 10, thus re-opening the contacts 15. In the course of its displacement, the wafer 19 encounters the bowed member 20, which it carries along with it, thus closing the contacts 14. The contacts 15 being open, the motor remains stopped.

It is to be noted that the contact studs slide slightly one upon the other during the displacements of the blades supporting them, so that a self-cleaning of their surfaces takes place. In addition, owing to the resilience of the blades, no rebounding of the studs takes place when the contacts close.

The position of the magnets, and especially of the magnet 11, may be adjustable, so that the exact moment when the motor stops can be adjusted.

Figure 6:
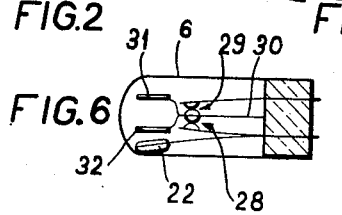
FIGURE 6 is an elevational view partly in section of a variant of the detail illustrated in FIGURES 2 to 5.

FIGURE 6 illustrates a variant of the switch contained in the tube 6. In this variant, the switch comprises two pairs of contact studs or rivets 28 and 29, each comprising a stud supported by a common blade 30 provided with two soft-iron wafers 31 and 32 intended to be attracted by the magnets 10 and 11 respectively. The wafer 32 is in addition subject to the action of an auxiliary magnet 22 identical to that of the first constructional form. The operation of this switch is similar to that described in the foregoing: When the arm 3 is inoperative, the wafer 31 is attracted by the magnet 10, thus opening the contact 28. When the switch is not situated in the zone of the magnets, the two contacts 28 and 29 are closed, as illusrated in FIGURE 6, and when the magnet 11 becomes effective at the end of the playing of a disc the wafer 32 is attracted, thereby opening the contact 29. The auxiliary magnet 2 maintains this contact 29 open until the instant when the magnet 10 opens the contact 28 when the arm 3 is returned into the inoperative position.

Further variants of this switch may be provided.

Figure 7:
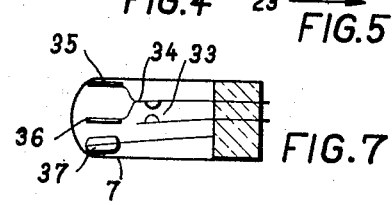
FIGURE 7 is an elevational view partly in section of another detail of the machine.

FIGURE 7 illustrates in detail the switch contained in the tube 7 of FIGURE 1. This switch is intended to be connected in parallel with the sound-reproducing circuit. It comprises a pair of contact studs 33, one of which is mounted on a resilient blade 34 carrying two soft-iron wafers 35 and 36 attracted by the magnets 10 and 11 respectively. The said switch comprises in addition an auxiliary holding magnet 37. When the record is being played, the switch in the tube 7 is in the position illustrated in FIGURE 7, in which the contact 33 is open. The sound reproduction can thus take place normally. At the end of the playing of a disc, the wafer 36 is attracted by the magnet 11, whereby the contact 33 is closed. The sound-reproducing circuit is thus short-circuited, whereby the machine is silenced. It will be advantageous to dispose the tubes 6 and 7 in relative positions such that the sound-reproducing circuit is short-circuited immediately before the stopping of the motor, in order that the opening of the switch 6 may not produce any extraneous noise. Owing to the auxiliary holding magnet 37, the contact 33 does not open again if the arm 3 carries out a reciprocating movement at the instant when the machine stops, such as generally occurs by reason of the arrangement of the last turns of the groove in the disc. In order that the contact 33 may open again and thus enable the machine to play, the wafer 35 must be attracted by the magnet 10 when the arm 3 occupies its inoperative position.

The invention is not limited to the embodiment described and illustrated. Thus, the magnets may be replaced by electromagnets. The two switches 6 and 7 may be combined in a single tube. Moreover, they need not be directly integral with the member by which they are driven, but they may be indirectly displaced thereby.

Finally, the stopping at the end of the playing of a disc need not be produced by the position of the arm 3, as in the example described and illustrated, but by the sudden movement made by the said arm when the reproducing head is situated opposite the last grooves in the disc. For this purpose, the magnet 11 may, for example, move simultaneously with the switch 6, its movable support being driven by the support of the switch through a friction coupling. When the switch suddenly moves at the end of the playing of a disc, a relative movement will take place between the magnet and the switch owing to the inertia of the magnet, as a result of which the switch will enter the zone of influence of the magnet, which will result in stopping of the motor.

It is to be noted that the friction coupling between the movable support of the switch and the magnet may be replaced by any other equivalent device producing the simultaneous displacement of these two parts when the support is slowly driven and a relative movement between them when the support moves rapidly.

What I claim is:

1. A device for controlling the opening and closing of an electric circuit, said device comprising, a contact assembly for the electric circuit to be opened and closed, said assembly including a pair of contacts and movable magnetically attractive resilient means supporting one of said contacts for said one contact to be moved to positions wherein respectively said one contact is closed to the other of said contacts and wherein said one contact is open relative to the other of said contacts, one of said positions of said one contact being reached mechanically by inherent mechanical bias of said magnetically attractive resilient means, and retention magnet means to maintain said one contact in the other of said positions by magnetically retaining said magnetically attractive resilient means against the inherent mechanical bias of said magnetically attractive resilient means, and said device further comprising control magnet means, said control magnet means and said assembly being relatively movable thus to occupy relative positions wherein said control magnet means magnetically attracts said magnetically attractive resilient means to said retention magnet means against the inherent mechanical bias of said magnetically attractive resilient means for said retention magnet means accordingly to maintain said one contact in said other of its positions relative to said other of said contacts, and said control magnet means and said assembly being relatively movable thus to occupy relative positions wherein magnetically attractive resilient means is attracted from said retention magnet means of the assembly by said control magnet means and brings said one contact to said one of its positions relative to said other of said contacts.

2. A device for controlling the opening and closing of an electric circuit, said device comprising, a contact assembly for the electric circuit to be opened and closed, said assembly including contact means, a pair of contacts and movable magnetically attractive resilient means supporting said pair of contacts for said contacts to be moved to a position wherein both of said contacts electrically conductively are closed to said contact means to close the circuit and to a position wherein one of said contacts is open relative to said contact means to open the circuit and the other of said contacts electrically conductively engages said contact means and to a position wherein said other of said contacts is open relative to said contact means to open the circuit and said one of said contacts electrically conductively engages said contact means, one of said positions of said contacts being reached mechanically by inherent mechanical bias of said magnetically attractive resilient means, and retention magnet means to maintain a second of said positions of said contacts by magnetically retaining said magnetically attractive resilient means against the inherent mechanical bias of said magnetically attractive resilient means, and said device further comprising control magnet means, said control magnet means and said assembly being relatively movable thus to occupy relative positions wherein said control magnet means magnetically attracts said magnetically attractive resilient means to said retention magnet means against the inherent mechanical bias of said magnetically attractive resilient means for said retention magnet means accordingly to maintain said second position of said contacts, said control magnet means and said assembly being relatively movable thus to occupy relative positions wherein said magnetically attractive resilient means is attracted from said retention magnet means of the assembly by said control magnet means and said contacts maintain a third of said positions of the contacts under a magnetic holding action of said control magnet means exerted upon said magnetically attractive resilient means, and said control magnet means and said assembly being relatively movable to occupy relative positions wherein said contacts have said one of said positions of the contacts.

3. A device for controlling the opening and closing of an electric circuit, said device comprising, a contact assembly for the electric circuit to be opened and closed, said assembly including contact means, a pair of contacts and movable magnetically attractive resilient means supporting said pair of contacts for said contacts to be moved to a position wherein both of said contacts electrically conductively are closed to said contact means to close the circuit and to a position wherein one of said contacts is open relative to said contact means to open the circuit and the other of said contacts electrically conductively engages said contact means and to a position wherein said other of said contacts is open relative to said contact means to open the circuit and said one of said contacts electrically conductively engages said contact means, one of said positions of said contacts being reached mechanically by inherent mechanical bias of said magnetically attractive resilient means, and retention magnet means to maintain a second of said positions of said contacts by magnetically retaining said magnetically attractive resilient means against the inherent mechanical bias of said magnetically attractive resilient means, and said device further comprising control magnet means including a pair of control magnets on opposite sides of said contact assembly, said control magnet means and said assembly being relatively movable thus to occupy relative positions wherein one of said control magnets magnetically attracts said magnetically attractive resilient means to said retention magnet means against the inherent mechanical bias of said magnetically attractive resilient means for said retention magnet means accordingly to maintain said second position of said contacts, said control magnet means and said assembly being relatively movable thus to occupy relative positions wherein said magnetically attractive resilient means is attracted from said retention magnet means of the assembly by the other of said control magnets and said contacts maintain a third of said positions of the contacts under a magnetic holding action of said other control magnet exerted upon said magnetically attractive resilient means, and said control means and said assembly being relatively movable to occupy relative positions wherein said contacts have said one of said positions of the contacts.

4. A device for controlling the opening and closing of an electric circuit, said device comprising, a contact assembly for the electric circuit to be opened and closed, said assembly including contact means of the circuit, a pair of contacts and movable magnetically attractive resilient means supporting said pair of contacts for said contacts to be moved to a position wherein both of said contacts electrically conductively are closed to said contact means and to a position wherein one of said contacts is open relative to said contact means and the other of said contacts electrically conductively engages said contact means and to a position wherein said other of said contacts is open relative to said contact means and said one of said contacts electrically conductively engages said contact means, said position wherein both of said contacts electrically conductively are closed to said contact means being reached mechanically by inherent mechanical bias of said magnetically attractive resilient means, and retention magnet means to maintain said position of said contacts wherein said one contact is open relative to said contact means by magnetically retaining said magnetically attractive resilient means against the inherent mechanical bias of said magnetically attractive resilient means, and said device further comprising control magnet means, said control magnet means and said assembly being relatively movable thus to occupy relative positions wherein said control magnet means magnetically attracts said magnetically attractive resilient means to said retention magnet means against the inherent mechanical bias of said magnetically attractive resilient means for said retention magnet means accordingly to maintain said position of said contacts wherein said one contact is open relative to said contact means, said control magnet means and said assembly being relatively movable thus to occupy relative positions wherein said magnetically attractive resilient means is attracted from said retention magnet means of the assembly by said control magnet means and said contacts take said position wherein said other contact is open relative to said contact means under a magnetic holding action of said control magnet means exerted upon said magnetically attractive resilient means, and said control magnet means and said assembly being relatively movable to occupy relative positions wherein correspondingly both of said contacts electrically conductively are closed to said contact means.

5. A device for controlling the opening and closing of an electric circuit, said device comprising, a contact assembly for the electric circuit to be opened and closed, said assembly including a pair of contacts and movable magnetically attractive resilient means supporting one of said contacts for said one contact to be moved to circuit closing position wherein said one contact engages the other of said contacts and to open circuit position wherein said one contact is spaced relative to the other of said contacts, said open circuit position of said one contact being reached mechanically by inherent mechanical bias of said magnetically attractive resilient means, and retention magnet means to maintain said one contact in said circuit closing position by magnetically retaining said magnetically attractive resilient means against the inherent mechanical bias of said magnetically attractive resilient means, and said device further comprising control magnet means, said control magnet means and said assembly being relatively movable thus to occupy relative positions wherein said control magnet means magnetically attracts said magnetically attractive resilient means to said retention magnet means against the inherent mechanical bias of said magnetically attractive resilient means for said retention magnet means accordingly to maintain said one contact in said circuit closing position relative to said other of said contacts, and said control magnet means and said assembly being relatively movable thus to occupy relative positions wherein said magnetically attractive resilient means is attracted from said retention magnet means of the assembly by said control magnet means and brings said one contact to said open circuit position relative to said other of said contacts.

References Cited in the file of this patent

UNITED STATES PATENTS

| 2,562,626 | McCabe | July 31, 1951 |
| 2,578,276 | Yarnall et al. | Dec. 11, 1951 |
| 2,843,697 | Beck | July 15, 1958 |